(12) United States Patent
Quinones (10) Patent No.: US 8,998,054 B2
(45) Date of Patent: Apr. 7, 2015

(54) HOLDER FOR TONGS

(71) Applicant: Melvin J Quinones, Las Vegas, NV (US)

(72) Inventor: Melvin J Quinones, Las Vegas, NV (US)

(*) Notice: Subject to any disclaimer, the term of this patent is extended or adjusted under 35 U.S.C. 154(b) by 0 days.

(21) Appl. No.: 14/298,968

(22) Filed: Jun. 9, 2014

(65) Prior Publication Data

US 2014/0361061 A1 Dec. 11, 2014

Related U.S. Application Data

(60) Provisional application No. 61/956,504, filed on Jun. 10, 2013.

(51) Int. Cl.
| | |
|---|---|
| A45F 5/02 | (2006.01) |
| B29C 53/04 | (2006.01) |
| B29C 53/36 | (2006.01) |
| B29K 105/00 | (2006.01) |

(52) U.S. Cl.
CPC ............... *A45F 5/021* (2013.01); *B29C 53/04* (2013.01); *B29C 53/36* (2013.01); *B29K 2105/256* (2013.01)

(58) Field of Classification Search
USPC .......... 224/660, 663, 676, 678, 679, 232, 251
See application file for complete search history.

(56) References Cited

U.S. PATENT DOCUMENTS

| | | | |
|---|---|---|---|
| 1,170,859 A | 2/1916 | Walker | |
| 2,500,257 A * | 3/1950 | Mahan | 224/250 |
| 3,128,926 A * | 4/1964 | Stella | 224/251 |
| 3,148,812 A | 9/1964 | Hilsinger | |
| 3,977,516 A * | 8/1976 | Tilve | 206/5 |
| 5,839,630 A | 11/1998 | Dustan | |
| 5,915,607 A * | 6/1999 | Newboult, Jr. | 224/232 |
| 6,029,872 A * | 2/2000 | Ellington | 224/251 |
| 6,648,192 B1 * | 11/2003 | Chong | 224/268 |
| 2008/0093406 A1 * | 4/2008 | Logan et al. | 224/682 |

OTHER PUBLICATIONS

Knife and Tongs Holster from Chef's Depot; http://www.chefdepot.net/cutleryholster.htm.

* cited by examiner

*Primary Examiner* — Brian D Nash
*Assistant Examiner* — Corey Skurdal
(74) *Attorney, Agent, or Firm* — Connie R Masters (57) ABSTRACT

A holder for a set of tongs is provided that includes a back anchoring portion with a tab joined to an intermediary bridge portion which is in turn joined to a forward tubular tong-receiving portion. A bend at the bridge portion positions the back anchoring portion to the back of the forward tong-receiving portion. The tab and bridge portion are adapted to be engaged over the top edge of an apron, apron tie, or similar support at a user's waist. The forward tong-receiving portion is formed into a generally open tubular-shape to receive a set of tongs. Preferably the holder is formed of a unitary continuous, thin blank. The support of the bridge and back anchor portion including a projecting tab allows the tongs to be inserted quickly and removed efficiently from the forward tubular tong-receiving portion.

17 Claims, 6 Drawing Sheets

HOLDER FOR TONGS

CROSS-REFERENCE TO RELATED APPLICATIONS

This non-provisional application claims the benefit of co-pending U.S. Provisional Patent Application Ser. No. 61/956,504, filed on Jun. 10, 2013, which is incorporated herein in its entirety.

FIELD OF INVENTION

This invention relates generally to kitchen tools and, more particularly, to a holder for tongs having a securing or anchoring portion adapted to be placed behind the top edge of an apron, apron tie, or similar support joined by a bridge to a tubular tong-receiving portion adapted to receive a set of tongs.

BACKGROUND OF THE INVENTION

A set of tongs is an indispensable tool used by chefs to tackle a variety of cooking tasks. The hinged arms of the generally metal tongs are configured with jaws that are positioned to engage each other and are parallel to the axis of the hinge or pivot. A typical length for the tongs is about 9 inches. The tongs can be used for grasping, flipping, holding, lifting, and moving a variety of hot or cold foods. For example, they can be used to turn a steak on a hot grill, lift a lobster out of boiling water, or retrieve hot baking pans from an oven.

In a commercial kitchen, where speed and efficiency are of great value, the versatile tongs are constantly in use by a chef. Yet keeping the tongs handy and ready for use presents problems. For instance, a chef may lay his tongs down to use both hands to move a heavy dish to another area of the kitchen, but then must waste valuable time retrieving the tongs. Or a chef may inadvertently pick up tongs forgotten by a nearby chef causing both chefs to loose time and efficiency in the mix up. A tong holder that maintains the tongs in a convenient place upon the chef, yet does not interfere with the work, is needed.

To address this problem, some chef aprons feature a cloth loop-like strap that is attached at or near the waist area of the apron. But it is neither fast nor efficient to hook and unhook the tongs onto the cloth loop. To engage the tongs with the cloth strap, one arm of the tongs must be hooked into the loop and extended onto the back side of the loop, while the second arm remains at the front of the loop. To then use the tongs again, the rearward arm must be disengaged from the flexible cloth loop. Though the procedure is not especially challenging, it is time-consuming and inconvenient in the fast-paced environment of a commercial kitchen. Furthermore, there is no convenient way to sanitize a cloth strip, except by removing the apron and replacing it with a freshly laundered apron.

Sanitation is of prime importance in the commercial kitchen. All tools and anything that they rest upon should be easy to sterilize at the end of a shift or even multiple times during a shift, if necessary.

Further, an ideal tong holder would be economical and easy to manufacture.

Therefore, there is a need for a tong holder that allows a chef to keep a set of tongs in a highly-accessible location on his person, that does not interfere with the chef's work duties, that provides swift, efficient removal and insertion of the tongs, that facilitates fast, effective sanitizing during or after a work shift, and that is economical and easy to manufacture.

BRIEF SUMMARY OF THE INVENTION

The present invention is directed to a holster or holder for a set of tongs that includes a back anchoring portion joined to a narrower intermediary bridge portion which is, in turn, joined to a wider, forward tubular-shaped tong-receiving portion. The open spiral, tubular tong-receiving portion is adapted to receive a set of tongs. The holder is preferably formed of a unitary continuous, thin blank. The preferably metal sheet forming the blank is bent at the bridge portion to bring the back anchoring portion near the forward tong-receiving portion.

The forward tong-receiving portion is rounded and formed into an open tubular roll-shape with an outward edge spiraling into the inner portion of the tubular roll-shape. The cross-section of portions of the tubular roll-shape may be circular or oval. For example, the anterior opening portion of the tubular roll-shape may be generally circular, while the cross-section of the tail portion of the tubular roll-shape may be generally oval to conform to the shape of the jaws at the end of the tong arms.

The bridge portion is adapted to be engaged over the top edge of an apron, apron tie, or similar waist support at a user's waist, thereby providing vertical support for the holder.

The back, anchoring portion is a thin member adapted to slip behind the waist support worn by the user, such as behind an apron and in front of the waistband of slacks. The back anchoring portion is preferably slightly curved to conform to the slight curvature of the user's waist area. The back anchoring portion stabilizes the tong-receiving portion against horizontal stress and provides a firm anchor for the tong-receiving portion. This allows a chef to quickly insert and remove the tongs from the tong holder, which is held steady by the back anchoring portion. The holder maintains the tongs in a highly-accessible location—right at waist level and ready to be immediately grasped as needed—but the small profile does not interfere with the chef's work duties. Additionally, the tong holder can be rotated by the user to different areas of the user's waist support, including both front and back locations. The tong holder is especially suitable for use by chefs that work at grills, fryer stations, sauté stations, or other stations that require extensive use of metal tongs.

Additionally, the tong holder is easily cleaned and sanitized. The rolled, open forward tong-receiving portion does not provide nooks and crannies that can easily retain food, but allows quick clean up through dipping the tong holder in a disinfectant, running clean water over and through the holder, placing the tong holder in an automatic dishwashing machine, or the like.

In addition, the preferred single unitary sheet that is bent and shaped to create the tong holder is economical and easy to manufacture.

An object of the present invention is to provide a holder that readily accommodates a set of tongs for quick insertion and removal.

An additional object of the present invention is to provide a holder for tongs that is easy to sanitize.

A further object of the present invention is to provide a holder for tongs that is economical to manufacture.

These and other objects, features, and advantages of the present invention will become more readily apparent from the attached drawings and from the detailed description of the preferred embodiments which follow.

BRIEF DESCRIPTION OF THE SEVERAL VIEWS OF THE DRAWINGS

The preferred embodiments of the invention will hereinafter be described in conjunction with the appended drawings, provided to illustrate and not to limit the invention, where like designations denote like elements.

Like reference numerals refer to like parts throughout the several views of the drawings.

DETAILED DESCRIPTION OF THE INVENTION

Figure 1:
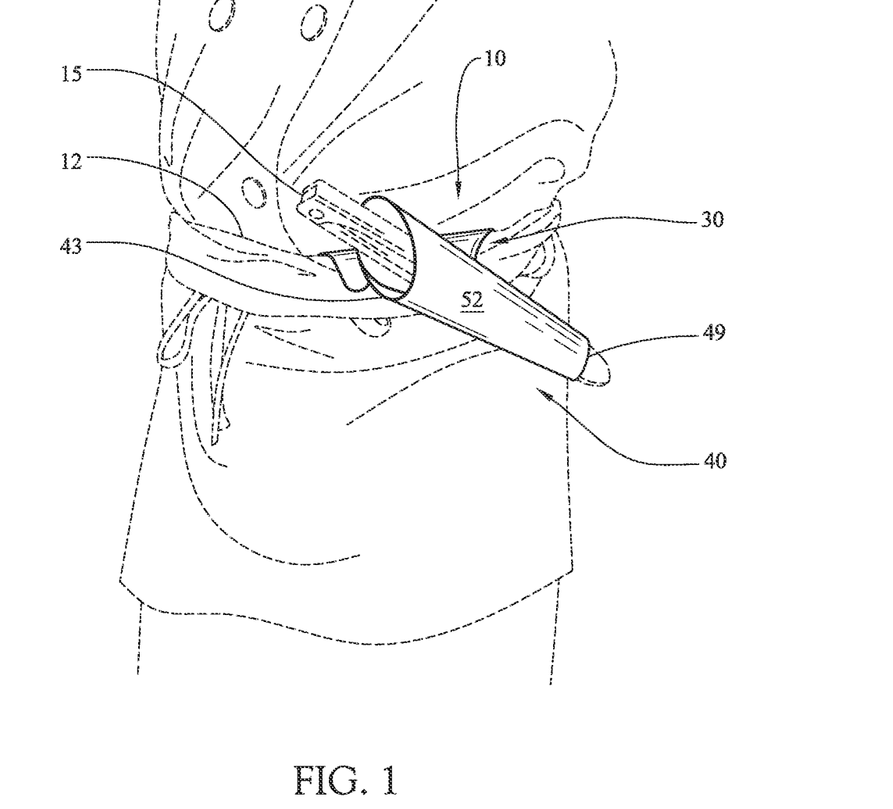
FIG. 1 is a perspective view of the holder for tongs of the present invention in the environment of use.

Shown throughout the figures, the present invention is directed toward a tong holder, shown generally as reference number 10. As seen in FIG. 1, the holder 10 is hung over the top edge of an apron, apron tie, belt, or similar waist support 12 at a user's waist, so the tongs 15 are held in the proper position for ready access by the chef and for quick and easy replacement of the tongs 15 back into the holder 10 between uses. The tong holder 10 comprises a back anchoring portion 20 (FIG. 2), an open tubular forward tong-receiving portion 40, and an intermediary bridge portion 30. The back anchoring portion 20 is connected via the intermediary bridge portion 30 to the forward tong-receiving portion 40. In use, the bridge 30 rests on top of the waist support 12 with the downward-extending back anchoring portion 20 slipped behind the waist support 12, which holds the tong-receiving portion 40 in a secure, forward generally horizontal-to-45 degree position for accepting the tongs 15.

The tong holder 10 is preferably formed of a single structural element. The single structural element of the tong holder 10 is herein described as a unitary, continuous blank of metal or metal-like material that is malleable and can be deformed without breaking. Although a metal blank is used as an example of a preferred fabrication method, alternatively, the tong holder 10 may be a single structural element formed through other means, such as by using injection molding or a three-dimensional printing system. Also, optionally, multiple thin sheets joined together could be used to form the holder 10.

Figure 2:
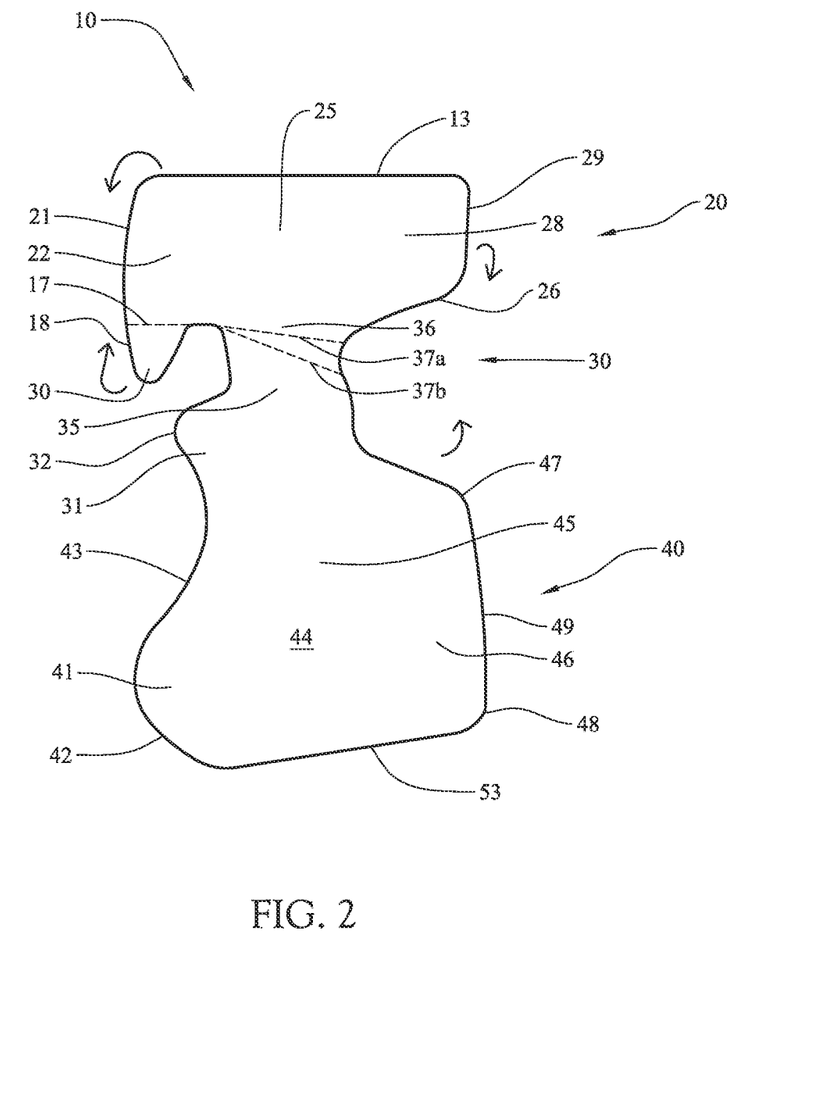
FIG. 2 is a top view of the unitary, continuous blank usable for forming the holder for tongs of the present invention.

A metal blank for forming the tong holder 10 is shown in FIG. 2. The metal blank is a longitudinally-extending unitary, continuous sheet, which extends from the longitudinal back edge 13 to the longitudinal front edge 53. The upper portion of the blank forms the back anchoring portion 20, the lower portion forms the forward tong-receiving portion 40, and the narrowed isthmus forms the intermediary bridge portion 30. References to "upper," "lower," "right," and "left" correspond to the orientation in FIG. 2 and are used only for the convenience of presentation and are not intended to be limiting as to arty specific orientation—for instance, when the tong holder 10 is fabricated for a left-handed user, the orientation would be reversed.

As seen in FIG. 2, the intermediary bridge portion 30 has a bridge rearward area 36 extending upward from the lateral (horizontal) center of bridge portion 30 and a bridge forward area 35 extending downward from the lateral center of bridge portion 30. The intermediary bridge portion 30 has a predetermined width, which may be, for example, in the range of from 1 to 6 inches. A fold line 37 extends from the left side to the right side of bridge portion 30. The fold line 37 may range generally between the lines designated 37a and 37b. Fold line 37a extends from approximately the upper left corner of bridge rearward area 36 to the upper right corner of the bridge rearward area 36, while fold line 37b extends generally diagonally from approximately the upper left corner area of bridge rearward area 36 to the lower right corner area of a bridge forward area 35. The fold line 37 defines the width of the portion of the tong holder 10 that rests on the top band of waist support 12.

Back anchoring portion 20 extends longitudinally (downward) from longitudinal back edge 13 to the rearward (upper) portion of bridge rearward area 36. Back anchoring portion 20 extends laterally from the first wing (left) lateral side edge 21 to second wing (right) lateral side edge 29.

The center portion of back anchoring portion 20 is designated as an anchor central section 25 having a width from a first lateral side to a second lateral side corresponding approximately to the width of bridge portion 30. The anchor central section 25 has a longitudinal length from longitudinal back edge 13 to the rearward (upper) portion of bridge rearward area 36 that is approximately 150% to 500% of the longitudinal length of bridge portion 30. To each side of the anchor central section 25 is a laterally extending portion. To the left of anchor central section 25 is first wing 22 and to the right is second wing 28. The anchor central section 25 extends in the vertical direction from the longitudinal back edge 13 downward to the bridge rearward area 36 and in the horizontal direction between first wing 22 and second wing 28. The corner where left first lateral edge 21 meets the longitudinal back edge 13 is rounded, and the corner where right edge 29 meets longitudinal back edge 13 is rounded.

The first wing 22 extends laterally from the left first lateral edge 21 to the first (left) lateral side of anchor central section 25. The first wing 22 extends longitudinally from the longitudinal back edge 13 at least to what is designated as tab fold line 17, which is a line segment generally in line with the top of bridge rearward area 36. In the preferred aspect, first wing 22 also extends below tab fold line 17 to include a forward (downward) longitudinally-extending, projecting tab 16.

In the preferred aspect, rounded projecting tab 16 has three sides. The backward (upper) side or base is generally horizontal, extending from the forward (lower) left portion of first wing 22 inwardly approximately 25% to 95% of the width of first wing 22. The other two sides of rounded projecting tab 16 form an acute angle extending forward (downward). The longitudinal length from the midpoint of the base downward to the apex may be from 40% to 130% of the longitudinal length (height) of bridge portion 30 and is preferably 50%90% of the longitudinal length (height) of bridge portion 30. Optionally, projecting tab 16 can be formed in other shapes, such as rectangular, square, pentagonal, octagonal, and the like. Any sharp edges are rounded for safety.

The first wing 22 is generally about the same longitudinal length (height) as the back anchoring portion 20 in the aspect without rounded projecting tab 16. In the preferred aspect including rounded projecting tab 16 the first wing 22 is generally about 50% to 150%, and preferably 70% to 110% of the longitudinal length (height) of the combined longitudinal length of anchor central section 25 and intermediary bridge portion 30.

The second wing 28 extends laterally from the second lateral (right) side of anchor central section 25 to the lateral edge 29 at the right. The second wing 28 extends longitudinally from the longitudinal back edge 13 to a forward (lower) edge 26. In one preferred aspect, lower edge 26 is slanted downward toward the point where it joins the upper right corner of bridge portion 30; left lateral edge 29 forms an angle with lower edge 26 of, for example, approximately 105 to 160 degrees, as shown. Therefore, the second wing 28 is generally about the same longitudinal length (height) as the anchor central section 25 at its left border but may be somewhat shorter than that longitudinal length at its right edge 29; for example, the right border may be from 50% to 120% of the longitudinal length of its left border with anchor central section 25 and is preferably 60% to 95% of the longitudinal length of its left border with anchor central section 25.

The first wing 22 and second wing 28 each have a lateral width of approximately 30% to 300% of the lateral width of anchor central section 25, and preferably a lateral width of 70-100% of the lateral width of anchor central section 25.

The forward tong-receiving portion 40 extends laterally from the left edges (first rounded projection edge 32, to the edge of advancing area 43, and second rounded projection edge 42) to right distal or receding edge 49 and extends longitudinally from the lower portion of bridge forward area 35 downward to the longitudinal front edge 53.

The forward tong-receiving portion 40 includes a receiving central section 45. The tong-receiving portion 40 also includes a first rounded projection 31 extending leftward at a rearward (upper) area of the receiving central section 45, a second rounded projection 41 extending leftward at a forward (lower) area of the receiving central section 45, and a right-extending tailpiece 46 extending rightward from receiving central section 45.

The receiving central section 45 has a first (left) lateral side and a second (right) lateral side and extends laterally there between. The receiving central section 45 extends longitudinally from the bridge forward area 35 to the longitudinal front edge 53. The longitudinal length of receiving central section 45 from the bridge forward area 35 to the longitudinal front edge 53 is a distance from 150% to 400% of the longitudinal length of anchor central section 25 (which extends from the longitudinal back edge 13 to the bridge rearward area 36). The receiving central section 45 has approximately the same width as the intermediary bridge portion 30.

A head portion extends laterally from the first, left side of receiving central section 45. The head portion includes a first rounded projection 31, a second rounded projection 41, and a receiving portion advancing area 43, as shown in FIG. 2. However, a head portion with projections 31, 41 of greater or lesser lateral width is within the scope of the invention.

The first rounded projection 31 protrudes laterally from the upper left side of the receiving central section 45. The lateral width at the widest point is about 15% to 90% of the lateral width of receiving central section 45. The longitudinal length of the first rounded projection 31 (at an imaginary line segment where the first rounded projection joins the receiving central section) is approximately 7% to 40% of the longitudinal length of receiving central section 45.

The second rounded projection 41 protrudes laterally from the lower left side of the receiving central section 45. The lateral width of second rounded projection 41 at the widest point is about 50% to 150% of the lateral width of receiving central section 45. The longitudinal length of the second rounded projection 41 (at an imaginary line segment where the second rounded projection joins the receiving central section) is approximately 20% to 75% of the longitudinal length of receiving central section 45.

Between the upper first rounded projection 31 and the lower second rounded projection 41 is the receiving portion advancing area 43. The receiving portion advancing area 43 is a part of the head portion that may be bounded by a curved edge, such as the convex arc shown disposed between the first rounded projection 31 and second rounded projection 41 that forms the outer, proximal or advancing edge of the open tubular tong-receiving portion 40 into which the tongs 15 are placed and out of which the hinged portion of the arms of tongs 15 protrudes. The lateral width of receiving portion advancing area 43 at its most narrow point may be small as in FIG. 2, or the receiving portion advancing area 43 may be reduced to a width of zero at its most narrow portion, or it may have a somewhat wider lateral width than shown in FIG. 2.

The tailpiece 46 extends laterally from the second (right) lateral side of the receiving central section 45 to the distal or receding edge 49. The tailpiece 46 forms the distal end of the open tube of the tong-receiving portion 40 which receives the jaws of the tongs 15. The longitudinal length of the tailpiece 46 is approximately 30% to 150% of the longitudinal length of receiving central section 45 and is preferably in the range of 60% to 90% of the longitudinal length of receiving central section 45. The lateral width of the tailpiece 46 is approximately 50% to 200% of the lateral width of receiving central section 45 and is preferably in the range of 60% to 90%. Preferably, the forward (downward) edge of tailpiece 46 is substantially in alignment with longitudinal front edge 53, i.e., the forward (downward) edge of tailpiece 46 forms a generally straight line with longitudinal front edge 53; however, tailpiece edge 46 may alternatively form an angle with longitudinal front edge 53. The forward edge of tailpiece 46 preferably forms a rounded corner with longitudinal front edge 53.

To create the tong holder 10 the blank described above is rolled and bent, as illustrated in FIGS. 3, 4, 5.

Figure 3:
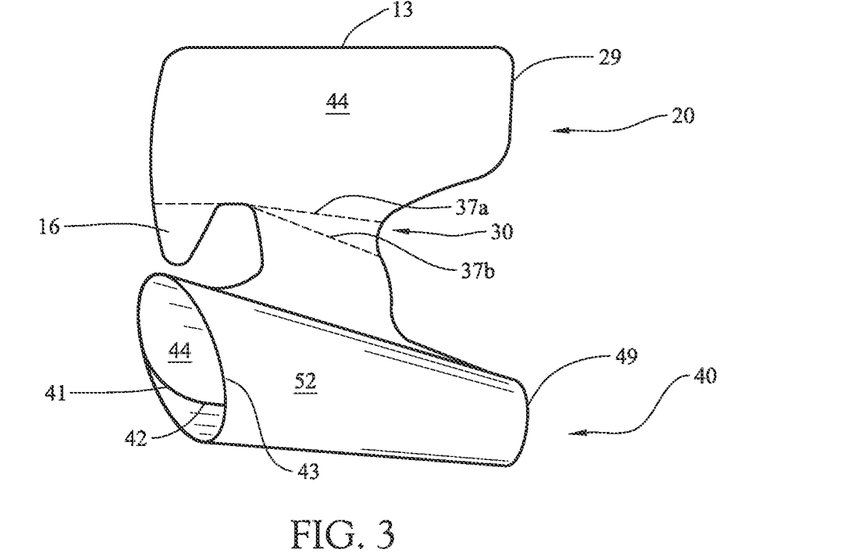
FIG. 3 is a front view of the unitary, continuous blank usable for forming the holder for tongs of the present invention with the forward tong-receiving portion rolled upward into an open spiral tubular-shape showing the outermost edge spiraling into a medial area of the blank.

As seen in FIG. 3, the tubular tong-receiving portion 40 is rolled by revolving the longitudinal front edge 53 forward, with the second rounded projection 41 brought near to, and spiraled slightly inside of, the first rounded projection 31 and with the lower tailpiece corner 48 brought near to, and spiraled slightly inside of, the upper tailpiece corner 47. The rolled tubular-shape of tong-receiving portion 40 preferably remains slightly open, i.e., the longitudinal front edge 53 is brought adjacent to (and spiraled slightly inside of) an imaginary line extending from corner 47 to first rounded projection 31 but is not sealed, thereby providing the adjustable spiral effect. The first surface 44 (the front-facing surface shown in FIG. 2) is rolled to the inside of the tubular-shape; the second surface 52 (the back-facing surface not seen in FIG. 2) forms the outside surface of the tubular-shape of the tong-receiving portion 40. The edge of advancing area 43 forms the outwardly extending proximal entrance of the tubular-shape of the tong-receiving portion 40. The rolled tailpiece 46 forms the distal end of the tubular-shape of tong-receiving portion 40, with the receding edge 49 defining the distal end of the tubular-shape.

The rolling to create the tong-receiving portion 40 may be performed by any standard metal rolling technique. For example, a slip roll machine, roll bending machine, roll forming machine, or the like may be used.

As needed to fit a particular set of tongs to be contained, some or all of the tubular-shape of tong-receiving portion 40 may have a generally circular cross-section or may have a somewhat oval cross-section. For example, the proximal end near advancing area 43 may have a circular cross-section, while the distal end of the tubular-shape near receding edge 49 may have a slightly oval cross-section to accommodate the width of the tong jaws. Or, as a second example, cross-sections taken anywhere along the tong-receiving portion 40 may have an oval shape.

Figure 4:
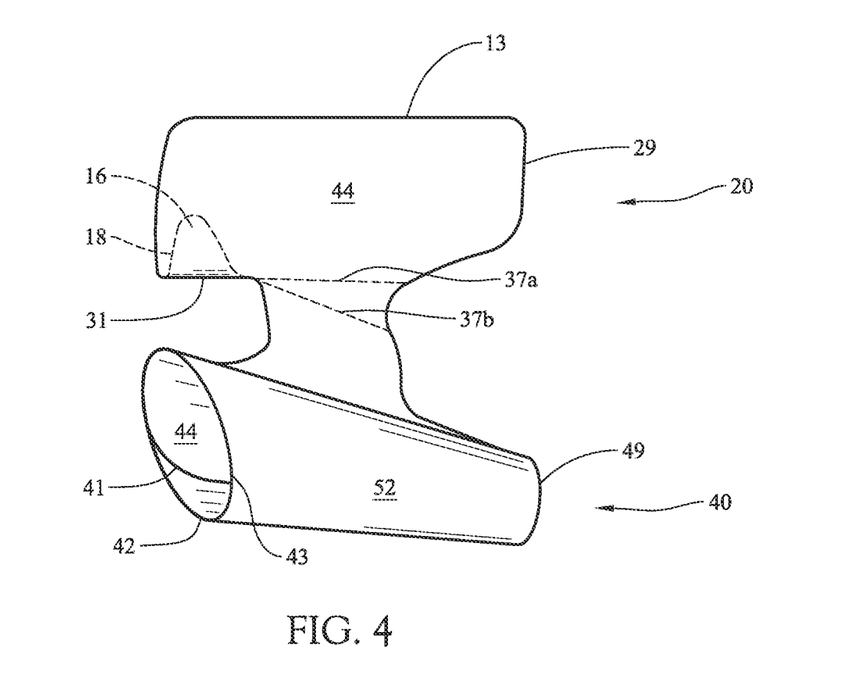
FIG. 4 is a front view of the unitary, continuous blank usable for forming the holder for tongs of FIG. 3 showing the bending of the projecting tab of the first wing of the back anchoring portion.

As shown in FIG. 4, the rounded projecting tab 16 is bent backwards (as shown in FIG. 4, but toward the front of the holder 10, as worn) at tab fold line 17 toward the first wing 22 with the second blank surface 52 to the interior of the fold, so tab 16 is shown in FIG. 4 in dashed lines behind the first wing 22. The bend leaves an opening sufficiently large between the back anchoring portion 20 and tab 16 to accommodate the cloth or other material of the waist support 12. The projecting tab 16 serves to stabilize the forward tong-receiving portion 40.

Figure 5:
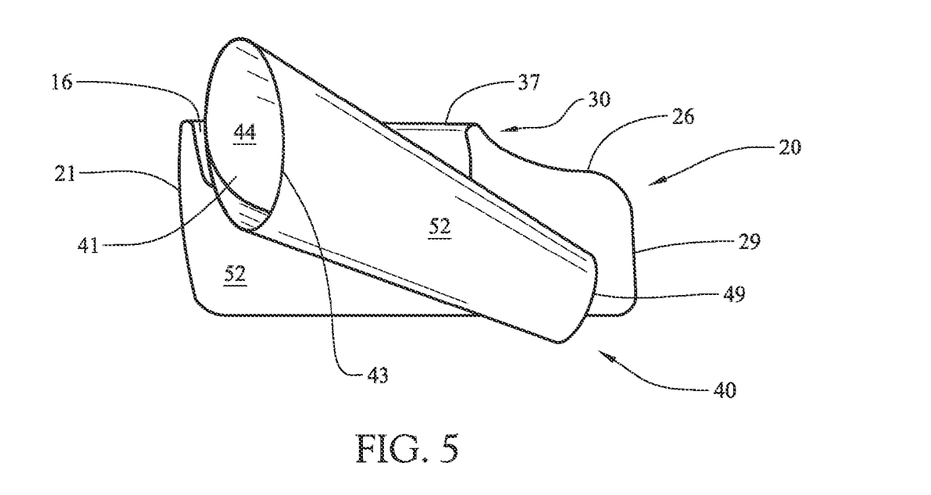
FIG. 5 is a front view of the holder for tongs of FIG. 4 with a fold at the bridge portion allowing the back anchoring portion to be positioned downward from the bridge at the back of the holder and the tong-receiving portion positioned at the front of the holder.

The holder 10 is shown completed in FIG. 5, the bridge portion having been bent at bridge fold line 37 to bring the first rounded projection 31 close to the back anchoring portion 20 with second surface 52 on the interior of the fold and with the first surface 44 of the bridge portion 30 facing upward. There is sufficient room between the bridge portion 30 and the back anchoring portion 20 to receive the top of waist support 12.

The back anchoring portion 20 is preferably slightly curved laterally to conform to the slight curvature of the user's waist area. The lateral curvature of the back anchoring portion 20 may be manually adjusted for comfort to a lesser or greater degree of curvature by the user, to correspond to his or her particular waist curvature.

The tubular tong-receiving portion 40 may be shaped to fit the shape of the tong arms and tong jaws. This may be done during fabrication or manually by the user. The slight spiral, with longitudinal front edge 53 spiraling into the first rounded projection 31 and tailpiece corner 47, allows the tubular tong-receiving portion 40 to be manually reduced or increased in size, as required. Either the proximal end near advancing area 43 or the distal end near receding edge 49 may be reduced or increased in diameter, or the entire tubular tong-receiving portion 40 may be reduced or increased. Additionally, if the jaws of a particular set of tongs are wider the tubular-shape may be deformed to have a wider oval cross-section. For example, a first chef may prefer tongs with slightly wider jaws, while a second chef may prefer tongs with narrower jaws. Therefore, the first chef may shape the distal end of his tong holder 10 into a tubular-shape with an oval cross-section, while the second chef may shape the distal end of his tong holder 10 into a tubular-shape with a generally circular cross-section. In general, the oval cross-section at the distal end near receding edge 49 serves to engage the jaws of the tongs, holding the jaws securely due to the action of the hinge of the tongs.

Figure 6:
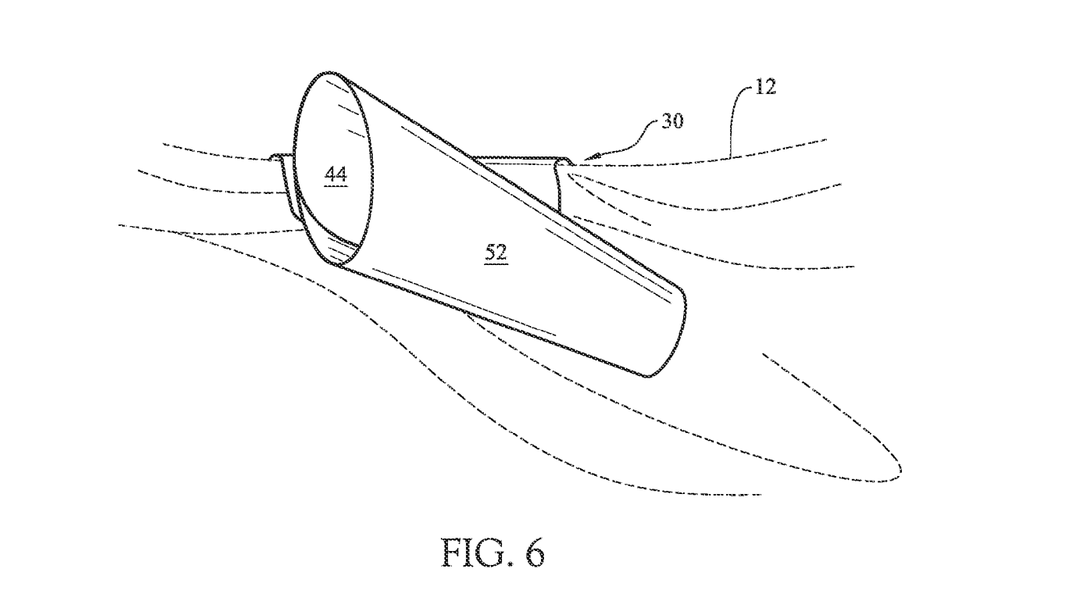
FIG. 6 is the tong holder of FIG. 5 shown in the environment of use with the bridge portion resting on the top edge of an apron, apron tie, or similar waist support at a user's waist and with the back anchoring portion behind the waist support, leaving the forward-facing tong-receiving portion projecting forward and in position to receive the tongs.

FIG. 6 shows the holder 10 of FIG. 5 with the bridge portion 30 and the rounded projecting tab 16 engaged over the top of the apron or waist support 12.

Figure 7:
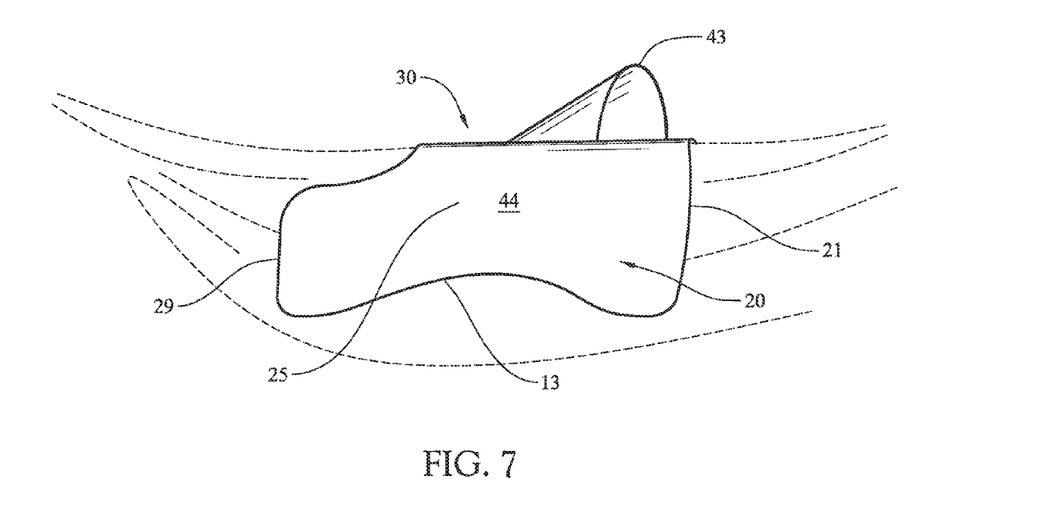
FIG. 7 is a back view of the tong holder in the environment of use showing the back anchoring portion behind the waist support.

FIG. 7 shows the rear view of the holder 10 shown in FIG. 6 and also shows a second aspect of longitudinal back edge 13. The longitudinal back edge 13 can be generally straight, as shown in FIG. 2, or may be shaped in an aesthetically-pleasing design. For example, the longitudinal back edge 13 can be wavy, can be shaped with multiple arcs, or may be shaped with a single arc (as shown).

Figure 8:
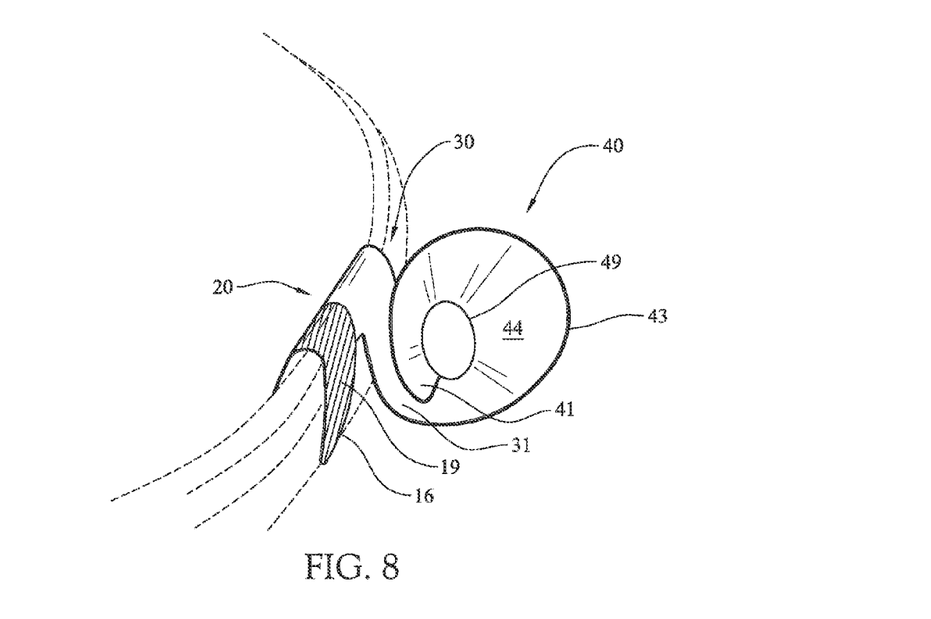
FIG. 8 is a side view of the tong holder in the environment of use with the bridge portion resting on the top edge of the waist support; this view is looking into the open spiral tubular-shape of the forward-facing tong-receiving portion into which the tongs are to be manually placed.

The side view of FIG. 8 shows the edge of the receiving portion advancing area 43 at the closer end of the tubular shape of tong-receiving portion 40 and receding edge 49 at the distal end of the tubular shape. The spiral effect with second rounded projection 41 spiraling inside first rounded projection 31 is also seen in FIG. 8. Additionally, a coating 19 is shown as applied to the rounded projecting tab 16.

Figure 9:
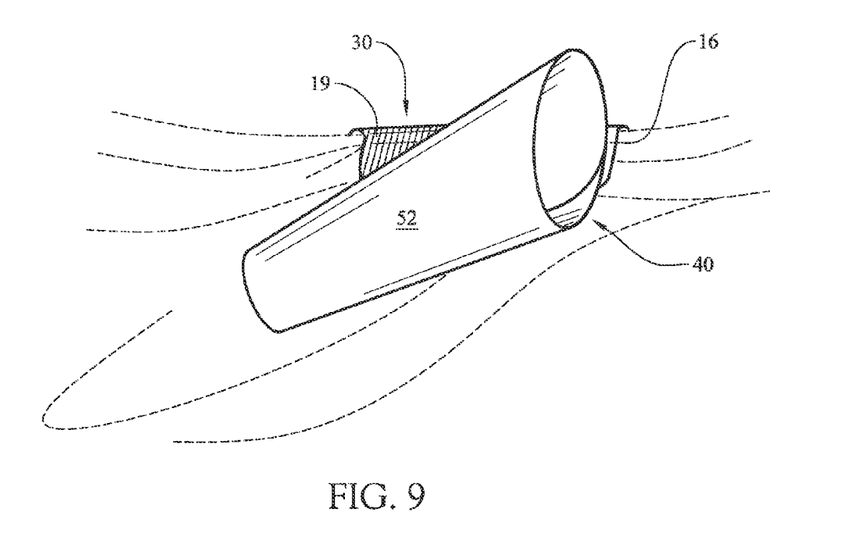
FIG. 9 is a front view of an embodiment of tong holder for a left-handed person shown in the environment of use with the forward tong-receiving portion rolled into an open tubular-shape, with the projecting tab of the first wing of the back anchoring portion bent downward for placement over the top of the apron or other waist support, and with a fold at the bridge portion with the back anchoring portion folded downward at the back of the holder and the forward tong-receiving portion positioned at the front of the holder.
Figure 10:
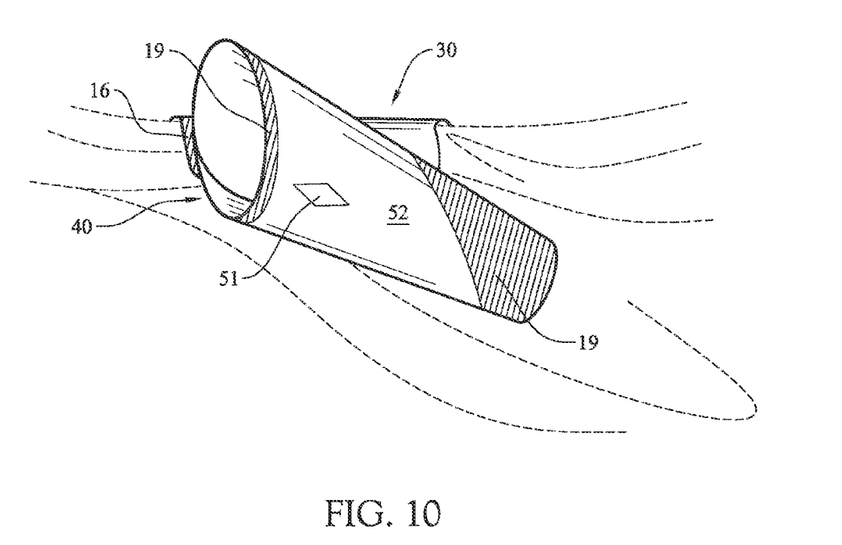
FIG. 10 is the tong holder of FIG. 5 shown in the environment of use with the addition of a logo or design and an optional coating.

As shown in FIGS. 8-10, a part (or all) of the holder 10 may be coated with a coating 19. The coating 19 may have aesthetic (color, pattern, texture, etc.), abrasion-resistance, and/or non-slip functions. It may be advantageous to apply coating 19 onto part or all of the back anchoring portion 20, especially the rounded projecting tab 16. An example of a suitable coating 19 is plastisol, a dispersion of polyvinyl chloride resin in plasticizers, which can be heated to a liquid suitable to receive the portion of the holder 10 to be coated. On cooling, the plastisol forms a permanent plasticized coating on the metal portion. Other types of coating 19 include any of a variety of paints or plasticized paints.

Also shown in FIG. 10 is a design area 51 that may add interest or reduce the weight of the holder 10. The design area may be disposed on any part of the holder 10, including the back anchoring portion 20, tong-receiving portion 40, or bridge portion 30. For instance, the design area may be stamped, printed, etched, inscribed, or otherwise applied a forward-facing portion of the tong holder 10 so as to be visible to bystanders, as shown, or the design area may be disposed on an area not viewable. The design 51 may be a logo, emblem, insignia, or indicia to enhance aesthetic appeal, or the design 51 may be formed by a cutout, perforation, or other removal of material to add interest or to reduce the weight of the holder 10.

To use the tong holder 10, a chef places the back anchoring portion 20 over the top of the waist support 12, and slips the thin back anchoring portion 20 behind the waist support. The tong holder 10 may be worn on the front waist or on the back waist and may be positioned at the center or at any other position preferred by the particular chef. The bend at bridge fold line 37 is then resting on the top of waist support 12 and the forward tong-receiving portion 40 is supported in a generally horizontal-to-45 degree position as shown in FIGS. 1 and 6-10.

To insert the tongs 15 into the tong holder 10, the chef contracts the hinged arms of the tongs 15 to bring the jaws of the tongs together, and then inserts the jaws of the tongs 15 into and through the proximal end of receiving portion 40 beginning at the outer edge of receiving portion advancing area 43. The jaws of the tongs are pushed into the tubular receiving portion 40 until the jaws are at or near the distal end (near receding edge 49) of the tubular receiving portion 40. The hinged portion of the arms of tongs 15 protrude out of the proximal end (near advancing area 43), thus providing the chef an adequate length of arm to quickly grasp for removing the tongs 15 from the holder 10. Research has shown that a chef quickly becomes accustomed to the usage of the new tong holder, and that within one to three days, the usage of the tong holder 10 becomes automatic for the chef. After this initial adjustment period, the speed of the chef is increased considerably by the usage of the convenient, secure tong holder 10.

The robust yet simple single piece design is easy to rinse, clean, sterilize, or otherwise sanitize. To clean the tong holder 10, the tong-receiving portion 40 or the entire holder 10 may be immersed into disinfectant, rinsed under running water, placed in an automatic dishwashing machine, or otherwise sanitized. It has been shown that food does not readily stick to the smooth design without nooks or crannies of holder 10.

A single material may be used to form the preferably unitary structure, or a laminated material may optionally be used. Stainless steel is a preferred metal, but other metals, such as aluminum, nickel, copper, brass, galvanized steel, titanium, phosphor bronze, and the like, may be utilized. The preferred gauge of the sheet metal is 24-gauge, though other gauges of sheet metal, such as 20 to 28-gauge may be utilized. The blank may be created using any standard metal-working processes, such as cutting (for example, laser cutting) or stamping. Appropriate smoothing or filing of the edges may be done, thereby improving appearance and safety.

Though the tong holder 10 has been described as preferably created from a thin, metal sheet blank, the tong holder 10 may optionally be unitarily formed of plastic materials through known molding means (such as injection molding, blow molding, thermoforming, three-dimensional printing, and the like) or may be formed of multiple segments joined together to form the structure herein described for holder 10.

The tong holder 10 has been herein described in dimensions suitable for receiving tongs of around 9 inches, which is a typical size for professional culinary usage. However, the dimensions can be scaled to accommodate smaller or larger tongs or other tools.

The tong holder 10 has been herein described as receiving a chef's tongs. However, other tools used in other occupations may also be advantageously held within the forward tong-receiving portion 40, either without modification or with a slight change in the spiral or in the shape of the cross-section of tong-receiving portion 40 to accommodate a different tool. For instance, within holder 10 a carpenter might store a rasp, a plumber might store a wrench, a beautician might store a pair of scissors, or a gardener might store a trimming tool.

The provided lightweight holder 10 allows a user to keep a tool in a highly-accessible and readily-reachable location (which is particularly desirable when both hands are needed for another action), allows swift removal and reinsertion of the tool, and facilitates fast and effective sanitizing during or after a work shift. Additionally, the holder 10 is economical and easy to manufacture.

The invention illustratively disclosed herein suitably may be practiced in the absence of any element which is not specifically disclosed herein.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A holder for tongs comprising a longitudinally-extending, unitary, continuous blank extending longitudinally from a longitudinal back edge to a longitudinal front edge that comprises:
    an intermediary bridge portion having a bridge lateral width, a bridge longitudinal length, a bridge forward area, and a bridge rearward area;
    a back anchoring portion comprising:
        an anchor central section having an anchor central section first lateral side and an anchor central section second lateral side; wherein said anchor central section extends laterally from said anchor central section first lateral side to said anchor central section second lateral side; wherein said anchor central section extends longitudinally from said longitudinal back edge to said bridge rearward area; wherein the longitudinal length from at least one point on said longitudinal back edge to said bridge rearward area is a distance at least 90% of said bridge longitudinal length; and wherein the lateral width of said anchor central section is approximately equal to said bridge lateral width;
        a first wing having a first wing lateral side edge; wherein said first wing comprises a forward longitudinally-extending, rounded projecting tab; wherein said first wing extends laterally from said anchor central section first lateral side to said first wing lateral side edge; and wherein said first wing extends longitudinally from said longitudinal back edge to the furthest projection of said projecting tab; and
        a second wing having a second wing lateral side edge, wherein said second wing extends laterally from said anchor central section second lateral side to said second wing lateral side edge;
    a forward tong-receiving portion comprising:
        a receiving central section having a receiving central section first lateral side and a receiving central section second lateral side; wherein said receiving central section extends laterally from said receiving central section first lateral side to said receiving central section second lateral side; wherein said receiving central section extends longitudinally from said bridge forward area to said longitudinal front edge; wherein the longitudinal length from said bridge forward area to said longitudinal front edge is a distance at least 150% of the longitudinal length of said anchor central section; and wherein the lateral width of said receiving central section is approximately equal to said bridge lateral width;
        a tailpiece including a distal receding edge; wherein said tailpiece extends laterally from said second lateral side of said receiving central section to said distal receding edge; and wherein the longitudinal length of said tailpiece at said receding edge is at least 50% of the longitudinal length of said receiving central section; and
        a head portion extending laterally from said receiving central section first lateral side.

2. The holder as recited in claim 1 wherein said bridge lateral width is between one and six inches.

3. The holder as recited in claim 2 wherein:
    the lateral width of said first wing is between 30% to 300% of the lateral width of said anchor central section;
    the lateral width of said second wing is between 30% to 300% of the lateral width of said anchor central section;

the longitudinal length of said first wing from at least one point on said longitudinal back edge to the furthest projection of said projecting tab is between 50% to 150%, of the longitudinal length of the combined longitudinal length of said anchor central section and said intermediary bridge portion;

the longitudinal length of said second wing at said second wing lateral side edge is from 50% to 120% of the longitudinal length of the anchor central section;

said projecting tab has a lateral width of between 25% and 95% of the lateral width of said first wing; and the longitudinal length of said projecting tab from the midpoint of the base to the furthest projection is between 40% to 130% of said bridge longitudinal length.

4. The holder as recited in claim 2 wherein said head portion comprises:

a first rounded projection extending laterally from said first lateral side of said receiving central section at an area proximal to said bridge portion;

a second rounded projection extending laterally from said first lateral side of said receiving central section at an area distal to said bridge portion; and a receiving portion advancing area disposed between said first rounded projection and said second rounded projection.

5. The holder as recited in claim 4, wherein:

the lateral width at the widest point of said first rounded projection point is between 15% to 90% of the lateral width of said receiving central section;

the longitudinal length of said first rounded projection at the line segment where said first rounded projection joins said receiving central section is between 7% and 40% of the longitudinal length of said receiving central section;

the lateral width at the widest point of said second rounded projection point is between 50% to 150% of the lateral width of receiving central section; and the longitudinal length of said second rounded projection at the line segment where said second rounded projection joins said receiving central section is between 20% and 75% of the longitudinal length of said receiving central section.

6. The holder as recited in claim 2 wherein:

said tailpiece has a longitudinal length at said distal, receding edge of between 30% to 150% of the longitudinal length of receiving central section; and said tailpiece has a lateral width between said receiving central section and said distal, receding edge of between 50% to 200% of the lateral width of receiving central section.

7. The holder as recited in claim 1 wherein at least a portion of said unitary, continuous blank is coated with a coating.

8. A holder for tongs, comprising:

an intermediary bridge portion having a bridge forward area, a bridge rearward area, a bridge longitudinal length, bridge lateral width, and a predetermined bridge fold line extending from the left side to the right side of said intermediary bridge portion;

a back anchoring portion comprising:

an anchor central section having an anchor central section first lateral side, an anchor central section second lateral side, and a longitudinal back edge; wherein said anchor central section extends laterally from said anchor central section first lateral side to said anchor central section second lateral side; wherein said anchor central section extends longitudinally from said longitudinal back edge to said bridge rearward area; wherein the longitudinal length from said longitudinal back edge to said bridge rearward area is a distance at least 150% of said bridge longitudinal length; and wherein the lateral width of said anchor central section is approximately equal to said bridge lateral width;

a first wing comprising a forward longitudinally-extending, rounded projecting tab and a first wing lateral side edge; wherein said first wing extends laterally from said anchor central section first lateral side to said first wing lateral side edge; wherein said first wing extends longitudinally from said longitudinal back edge to the furthest projection of said projecting tab; and wherein said projecting tab is bent at its base toward the front of said back anchoring portion leaving an opening between said projecting tab and said back anchoring portion of sufficient size to accommodate a piece of cloth; and a second wing having a second wing lateral side edge, wherein said second wing extends laterally from said anchor central section second lateral side to said second wing lateral side edge; and a tubular forward tong-receiving portion having a longitudinal front edge and comprising:

a receiving central section having a receiving central section first lateral side and a receiving central section second lateral side; wherein said receiving central section extends laterally from said receiving central section first lateral side to said receiving central section second lateral side; wherein said receiving central section extends longitudinally from bridge forward area to said longitudinal front edge; and wherein said receiving central section has approximately the same width as said intermediary bridge portion;

a tailpiece including a lower tailpiece corner, an upper tailpiece corner, and a distal receding edge; wherein said tailpiece extends laterally from said receiving central section second lateral side to said distal receding edge;

a head portion extending laterally from said receiving central section first lateral side;

and wherein:

said tong-receiving portion is formed into a tubular, spiral shape with said longitudinal front edge rolled adjacent to said intermediary bridge portion, and with said lower tailpiece corner rolled inside said upper tailpiece corner; and said intermediary bridge portion is bent forward at said bridge fold line to position said tong-receiving portion forward of said intermediary bridge portion and to position said back anchoring portion rearward of said intermediary bridge portion with said tong-receiving portion brought near to said back anchoring portion while leaving an opening between said tong-receiving portion and said back anchoring portion of sufficient size to accommodate a piece of cloth.

9. The holder as recited in claim 8 wherein a cross-section of the proximal portion of said tong-receiving portion is substantially circular.

10. The holder as recited in claim 8 wherein a cross-section of the distal portion of said tong-receiving portion is oval.

11. The holder as recited in claim 8 wherein said bridge fold line runs diagonally from the corner at which said anchor central section first lateral side meets said rearward area of said intermediary bridge portion to the corner at which said receiving central section second lateral side meets said forward area of said bridge portion.

12. The holder as recited in claim 8 wherein said bridge fold line runs generally horizontally along said rearward area of said intermediary bridge portion.

13. The holder as recited in claim 8 wherein said back anchoring portion is gently curved laterally to correspond generally to the shape of a user's waist.

14. The holder as recited in claim 8 wherein said bridge lateral width is between one and six inches.

15. The holder as recited in claim 8 wherein at least a portion of said holder is coated with a coating.

16. The holder as recited in claim 15 wherein said coating comprises plastisol.

17. The holder as recited in claim 8 wherein said head portion comprises:
- a first rounded projection extending laterally from said receiving central section first lateral side at an area proximal to said bridge portion;
- a second rounded projection extending laterally from said receiving central section first lateral side at an area distal to said bridge portion; and wherein said second rounded projection is rolled inside said first rounded projection; and
- a receiving portion advancing area disposed between said first rounded projection and said second rounded projection.

* * * * *